Patented Sept. 8, 1936

2,053,432

UNITED STATES PATENT OFFICE 2,053,432

PROCESS OF PREPARING PHOSPHATE FERTILIZER

Edward W. Harvey, Highland Park, N. J., assignor to The Barrett Company, New York, N. Y., a corporation of New Jersey No Drawing. Application September 13, 1933, Serial No. 689,271

2 Claims. (Cl. 71—9)

This invention relates to fertilizers and processes for their preparation. More particularly, this invention relates to a fertilizer containing an ammoniated superphosphate and calcium or magnesium carbonate or both.

It has heretofore been proposed to treat a superphosphate such as ordinary superphosphate or triple superphosphate with ammonia and to utilize the resulting product either alone or in admixture with other fertilizer compounds such as ammonium sulfate, as a fertilizer. Superphosphate itself acidic in character. By the treatment of superphosphate with ammonia the free acidity of the superphosphate is neutralized but when such an ammoniated superphosphate, particularly if admixed with other fertilizer salts such as ammonium sulfate, is employed for the treatment of soils, the acidity of the soil is increased as a result of extraction from the fertilizer of basic plant nutritive elements leaving acid-forming elements in the soil. It has also heretofore been proposed to mix superphosphates with basic materials such as limestone in order to neutralize the free acidity of the superphosphate itself but, in so doing, the tendency of the fertilizer to cake is increased as is also the amount of unavailable $P_2O_5$ in the phosphate due to chemical reactions taking place between the superphosphate and the limestone.

It is an object of this invention to provide a fertilizer composition containing superphosphate with or without additional fertilizer salts which, when used, does not act to increase the soil acidity and which, as prepared, is non-acid in character yet retains a non-caking, free-flowing character and contains a relatively high proportion of its $P_2O_5$ in available form. It is a further object of this invention to provide a process for the production of the aforesaid fertilizer.

In carrying out the process of this invention a superphosphate such as ordinary commercial superphosphate or triple superphosphate is treated with ammonia in amount sufficient to neutralize the free acidity of the superphosphate and preferably sufficient to react with the monocalcium phosphate of the superphosphate to form dicalcium phosphate. The resulting ammoniated superphosphate in a comminuted form is mixed with calcium or magnesium carbonate, preferably in finely divided form, which may be supplied in the form of ground limestone or a ground dolomite. The materials after being intimately admixed are ready for packing and shipping.

Fertilizer compositions containing various salts may be prepared in accordance with this invention by incorporating a salt such as ammonium nitrate, sodium nitrate, potassium nitrate, potassium chloride, ammonium sulfate, urea and the like, with the superphosphate before, after or simultaneously with its treatment with ammonia. These added fertilizer salts likewise may be incorporated with the superphosphate by ammoniating the superphosphate with a solution of a salt in an ammoniacal liquid which may be either anhydrous liquid ammonia or aqua ammonia. The calcium or magnesium carbonate may be added in any desirable proportions but it is preferable that the fertilizer contain about 2.5% to 25% of calcium carbonate and/or magnesium carbonate. A non-acid-forming fertilizer may be prepared by adding substantially 75 pounds of limestone per 100 pounds of ammonium sulfate equivalent of the fertilizer mixture, i. e. per 100 pounds of ammonium sulfate or other constituent forming an amount of acid in the soil equal to that formed by 100 pounds of ammonium sulfate.

As an explanation of the advantageous character of the fertilizer compositions of this invention with respect to minimizing reaction between the calcium or magnesium carbonate and phosphate and caking of the mixed fertilizers the following possibilities are suggested, although the invention is not intended to be limited thereby: First, by ammoniating superphosphate the resulting ammoniated product appears to be less reactive in contact with calcium carbonate or magnesium carbonate than is the original superphosphate before ammoniation. This would appear due to a conversion of free phosphoric acid and of the acidic monocalcium phosphate into dicalcium phosphate. Secondly, by the reaction of ammonia with superphosphate, water soluble ammonium salts (ammonium sulfate and/or ammonium phosphate) are formed and it would appear that the presence of these soluble salts in the ammoniated superphosphate may inhibit a reaction of the ammoniated superphosphate with calcium carbonate and magnesium carbonate.

I claim:

1. The process for preparing a fertilizer which comprises reacting a superphosphate with ammonia in amount sufficient to neutralize the free acidity of said superphosphate and mixing the resulting ammoniated superphosphate product with a finely divided material from the group consisting of calcium and magnesium carbonates in amount such that the resulting mixture contains about 2.5% to 25% of said material, whereby a non-caking fertilizer containing a relatively high proportion of its $P_2O_5$ in available form is produced.

2. The process for preparing a fertilizer which comprises treating a superphosphate with ammonia in amount sufficient to neutralize the free acidity of said superphosphate and mixing the ammoniated superphosphate with an acid forming salt and finely divided limestone in the proportions of about 75 pounds of limestone to 100 pounds of ammonium sulfate equivalent of said fertilizer, whereby a non-caking fertilizer containing a relatively high proportion of its $P_2O_5$ in available form is produced.

EDWARD W. HARVEY.